Feb. 16, 1960     A. E. CUTLER     2,924,893
FLIGHT TRAINING APPARATUS

Filed April 19, 1955     2 Sheets-Sheet 1

INVENTOR
ALBERT ERNEST CUTLER

BY *Watson, Cole, Grindle & Watson*

ATTORNEY

Feb. 16, 1960

A. E. CUTLER 2,924,893

FLIGHT TRAINING APPARATUS

Filed April 19, 1955

INVENTOR
ALBERT ERNEST CUTLER

BY Watson, Cole, Grindle & Watson
ATTORNEY

United States Patent Office 2,924,893
Patented Feb. 16, 1960

2,924,893

FLIGHT TRAINING APPARATUS

Albert E. Cutler, Crawley, England, assignor to Communications Patents Limited

Application April 19, 1955, Serial No. 502,270

Claims priority, application Great Britain May 26, 1954

2 Claims. (Cl. 35—12)

This invention relates to ground-based flight training apparatus.

It has been proposed that, in order to facilitate the landing of an aircraft, there should be used a three-dimensional array of indicators of known position with respect to the landing surface, the expression "three-dimensional array" being intended to mean an array of indicators such that the pilot of an aircraft, during his approach to the landing surface sees in certain circumstances at least one of the indicators (or an image thereof) as if it is behind or in front of the remaining indicators. In one such three-dimensional array a mirror is placed between the two halves of a row of lamps, a further lamp being arranged in front of the mirror so that its reflection can be seen in the mirror by a pilot making his landing approach. The whole array is mounted on the landing surface and, where this surface is provided by the deck of an aircraft carrier, the array is mounted on a gyro-stabilized platform. When the pilot sees the reflection in line with the row of lamps, he knows that he is on the correct glide path; if the reflection is not aligned with the row of lamps, that is to say it appears to be either behind or in front of the row, he knows that it is necessary for him to take suitable corrective action. Similarly, when the pilot sees the reflection equidistant from the two halves of the two rows of lamps, he knows that his heading is correct. The mirror may be made concave in order to enlarge the angle within which the reflection can be seen.

An object of the present invention is to provide apparatus by means of which visual simulation of a landing approach aided by a three-dimensional array of indicators can be obtained, and in particular visual simulation of a landing approach aided by a three-dimensional array of lamps.

Other objects of the invention are to provide means for appropriately modifying the size of an image of the array of lamps, with change of the assumed range of the aircraft from the array, and to provide apparatus for positioning the image on a screen so that a student pilot will see it with the appropriate train and elevation angles.

According to one aspect of the invention, flight training apparatus for training a pilot in the landing of an aircraft with the aid of a pattern of indicators of known position with respect to the landing surface, includes means adapted to establish on a screen visible to the student pilot images representing the indicators, and means whereby the relative positions of the images of the indicators on the screen are controlled in accordance with the assumed or computed relative position of the aircraft and the said pattern of indicators.

An embodiment of the invention will now be described, by way of example only, with reference to the accompanying drawings. This embodiment is concerned with the visual simulation of a landing approach to an aircraft carrier on which are arranged a horizontal row of lamps, a mirror placed between the two halves of the row of lamps, and a further lamp located in front of the mirror and masked so that only its reflection in the mirror is seen from the approaching aircraft.

The dummy aircraft, which includes controls corresponding to those of a real aircraft, and the computing means for calculating the relative movement of the aircraft and ship, form no part of the present invention and will not be described in detail. It will be assumed, however, that there are available electric signals representative of the quantities.

$$\frac{d}{2}$$

$s_1$, $s_2$, $\theta$ and $\phi$, which will be defined hereinafter and of which the method of calculation will be indicated in the description. These signals can be set up directly instead of being calculated from the movements of the aircraft controls.

Figure 1:
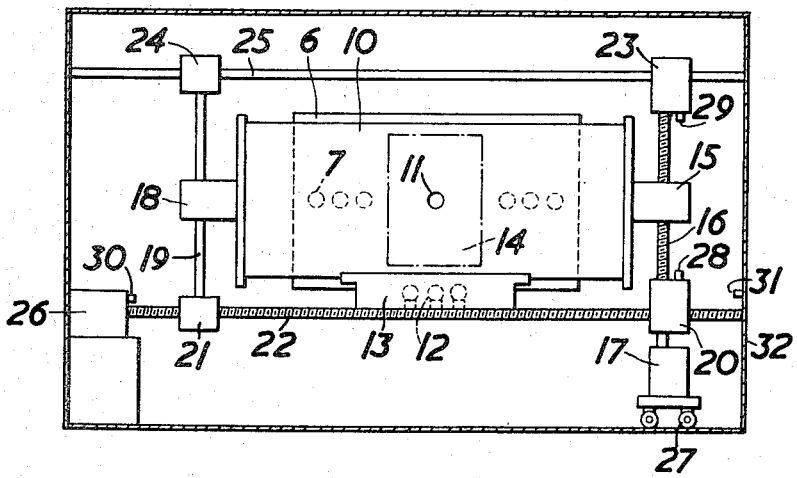
Fig. 1 shows apparatus for obtaining relative movement between a single light source, representing the reflection in the mirror, and a row of light sources, representing the row of fixed lamps.

In the embodiment to be described, an image of a row of illuminated areas is established on a screen visible to the student pilot. Means are provided for causing movement of the image of one of these illuminated areas, relative to the others, to simulate the change in the appearance of an array of lamps of the kind described from an aircraft which is moving with respect to the said array. Further means are described for appropriately controlling the size of the image on the screen, the location of the image on the screen, and the orientation of the image. In the following description, it is assumed that in the system which is being simulated the mirror has a cylindrical surface, being plane in the vertical cross-section and concave in the horizontal cross-section.

An opaque screen 6 having a row of apertures 7 is mounted in front of a row of lamps 8 on a base 9 so that the light from the lamps shines through the apertures. A transparent polymethyl methacrylate screen 10, mounted in front of the screen 6, has formed therein a single small cylindrical recess 11 which is filled with a substance having a coarse crystalline structure such as Epsom salts, and the screen is illuminated from its lower edge by means of lamps 12 in a housing 13 which is fixed to the transparent screen 10. With this arrangement, the light from the lamps is totally internally reflected in the transparent screen except at the cylindrical recess, where the crystalline material is illuminated, this representing the reflection of the forward lamp in the mirror.

The transparent screen is mounted so as to be movable within limits along its axes, the limits being such that the illuminated area 11 can be given any position within the chain-dotted rectangle 14, which represents the mirror. This movement of the transparent screen is made possible by mounting the screen on a gantry including two mutually perpendicular lead-screws. At one end of the screen there is fixed a bearing block 15 having an internally-threaded aperture through which passes a lead-screw 16 which is driven by a follow-up motor unit 17 to which there are applied signals representative of the vertical distance $s_1$ of the point of reflection from the centre of the mirror. The distance $s_1$ is approximately equal to:

$$\frac{D}{R}(h - RA)$$

D is the distance of the forward lamp from the centre of the mirror;
R is the slant range of the aircraft from the mirror;
$h$ is the height of the aircraft above the centre of the mirror; and
A is the angle made by the chosen glide path with the horizontal, and is expressed in radians.

The other end of the transparent sheet is mounted on a bearing block 18 which slides on a smooth rod 19.

The vertical lead-screw 16 and the vertical rod 19 are supported in two blocks 20 and 21 which contain horizontal internally-threaded apertures through which passes a lead-screw 22, and in two blocks 23 and 24 through which passes a smooth supporting rod 25. The lead-screw 22 is rotated by a follow-up motor unit 26 to which there are applied electric signals representing the horizontal distance $s_2$ of the point of reflection from the centre of the mirror. The distance $s_2$ is approximately equal to:

$$r_1 \cos\left(a + \tan^{-1} \frac{y}{x}\right)$$

where
$r_1$ is the radius of curvature of the mirror;
$a$ is the heading of the aircraft carrier;
$x$ and $y$ are the east-west and north-south distances respectively of the aircraft from the mirror.

The motor unit 17 is mounted on rollers 27.

Limit switches 28 and 29 are mounted on the blocks 20 and 23 and are operated when the transparent sheet reaches the upper and lower limit respectively of its vertical travel, i.e. when the illuminated area 11 reaches the upper or lower edge of the chain-dotted rectangle 14. Operation of either of these switches extinguishes the lamps 12 and prevents further rotation in the same direction of the motor unit 17. Similar limit switches 30 and 31 on the casing of the motor unit 26 and on the end wall 32 respectively extinguish the lamps 12 and prevent further rotation in the same direction of the motor 26 when the illuminated area 11 in the transparent sheet reaches the vertical sides of the chain-dotted rectangle 14.

Figure 2:
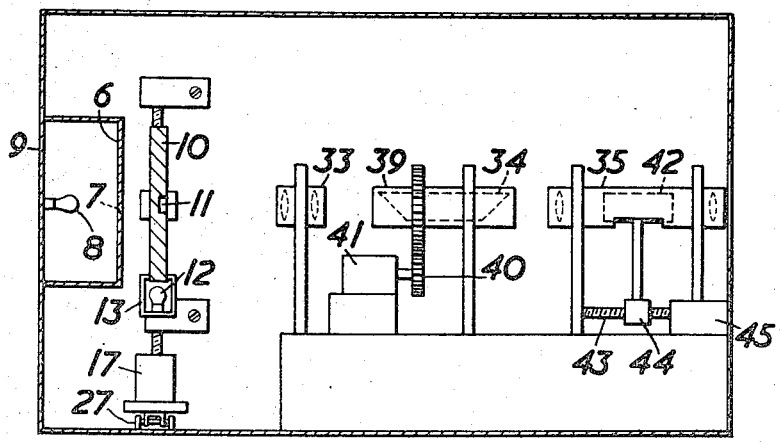
Fig. 2 shows a projector for projecting an image of the light sources of Fig. 1 on to a screen.

As shown in Fig. 2, light from the lamps 8 and the illuminated area 11 is passed through a lens unit 33 to a Dove reflecting prism 34, and thence to a further lens unit 35 which focuses the light on to a cylindrical screen. The screen is shown at 36 in Fig. 3, which also shows the projector unit 37 mounted on the axis of the cylinder on the nose 38 of the dummy cockpit in which the student pilot is seated during an exercise.

The prism 34 is mounted in a tube 39 which can be rotated through gearing 40 by means of a follow-up motor unit 41 to which there are applied electric signals representative of an angle $$\frac{d}{2}$$

given by the expression:

$$\cos d = -\sin r \sin B \cos \theta$$

where
$\theta$ is the pitching angle of the aircraft;
$r$ is the relative bearing of the fore-and-aft axis of the aircraft with respect to the fore-and-aft axis of the carrier on which the lamp array is mounted;
B is the angle of depression of the lamp array, from the aircraft position, with reference to the horizontal, as defined above.

The effect of this is to rotate the image so that the relationship between the image of the illuminated areas 7 and 11 and the horizontal transverse axis of the trainer cockpit corresponds to the relationship which exists between the real gyro-stabilised row of lamps and the transverse axis of the real aircraft as it approaches the carrier.

Since the use of a Dove prism causes a horizontal inversion of the projected image, it is arranged that the direction of rotation of the lead-screw 22 at any moment is the reverse of that which would be provided in the absence of the Dove prism.

The lens unit 35 is of the kind known as a "zoom lens" and includes a movable component which is represented diagrammatically at 42 in Fig. 2. This movable component is mounted on a lead-screw 43 by means of a block 44 having an internally-threaded aperture, so that the said component is moved along the axis of the lens unit 35 when the lead-screw is rotated by a follow-up motor unit 45 to which there are applied signals which vary as a function of the range of the aircraft from the lamp array. When the component 42 is moved in this manner, the size of the image of the screen is reduced or increased, according to the direction of movement, while the image remains in focus.

Figure 4:
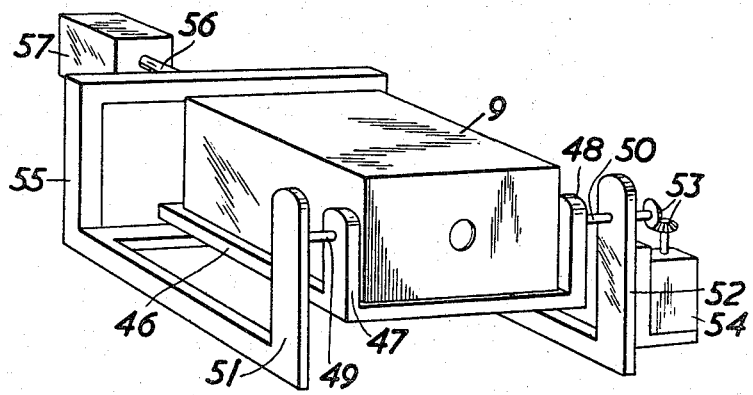
Fig. 4 illustrates apparatus for varying the angular position of the optical axis of the projector.
Figure 5:
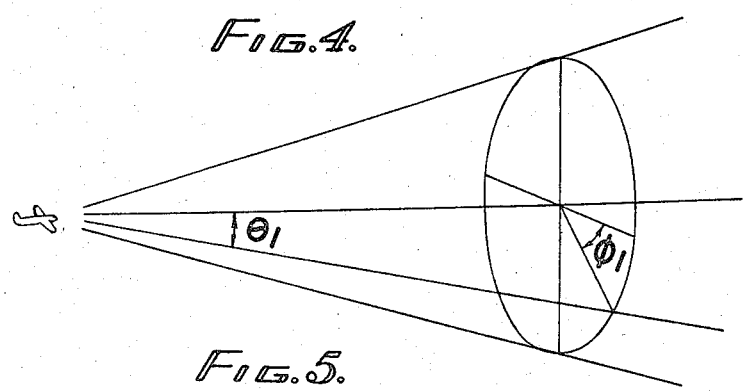
Fig. 5 is a diagram illustrating the operation of the apparatus.

The units which have been described are mounted so that they can be given angular movement, as a whole, whereby the position of the image on the screen can be made to vary. This arrangement is shown in Fig. 4, in which these units are arranged on a platform 46 which is provided with two uprights 47 and 48 in which are fixed shafts 49 and 50, in line with the transverse axis of the optical system. These shafts are pivotally mounted in supports 51 and 52, the shaft 50 being driven through bevel gearing 53 by a follow-up motor 54 which is mounted on the support 52. Electric signals representative of an angle $\theta_1$ (Fig. 5) are applied to the motor unit 54. It will be seen from this figure that the angle $\theta_1$ is the angle made by the line of sight to the lamp array from the aircraft with the fore-and-aft axis of the aircraft. The angle $\theta_1$ thus defines a cone about the extension of the fore-and-aft axis of the aircraft, the lamp array lying somewhere on the surface of this cone. The platform 46 and the lamp and optical units are rotated by the motor unit 54 about the axes of the shafts 49 and 50 until they reach an angular position corresponding to the angle $\theta_1$, which can be computed from the formula $$\cos \theta_1 = \cos \theta \cos r \cos B - \sin B \sin \theta$$

where $\theta$, $r$, and B represent the same variables as before.

The supports 51 and 52 are fixed to a frame 55 at the rear of the unit. This frame 55 is mounted on a shaft 56 which is driven by a follow-up motor unit 57. The motor unit 57 is controlled by electric signals representing an angle $\phi_1$ (Fig. 5), this being the angle between two planes containing the fore-and-aft axis of the aircraft, one of these being a reference plane fixed with respect to the aircraft (in this case the transverse plane of the aircraft) and the other the plane containing the line of sight. Thus the angle $\phi_1$ determines a line on the cone defined by the angle $\theta_1$, this being the line of sight. The angular position at any moment of the frame and the apparatus mounted thereon about the axis of the shaft 56, the extension of which passes through the optical axis of the system, is equal to the angle $\phi_1$.

This angle $\phi_1$ can be computed from the relationship:

$$\phi_1 = \phi_2 + \phi$$

where $\phi$ is the roll angle of the aircraft and $\phi_2$ is given by $$\tan \phi_2 = \frac{\sin r}{\cos \theta \cos r \tan B + \sin \theta}$$

In this way, the follow-up motors 54 and 57, controlled in accordance with the angles $\theta_1$ and $\phi_1$ respectively, move the optical unit into an angular position, with respect to the fore-and-aft axis of the trainer cockpit, corresponding to that of the line of sight with respect to the fore-and-aft axis of the aircraft.

Figure 3:
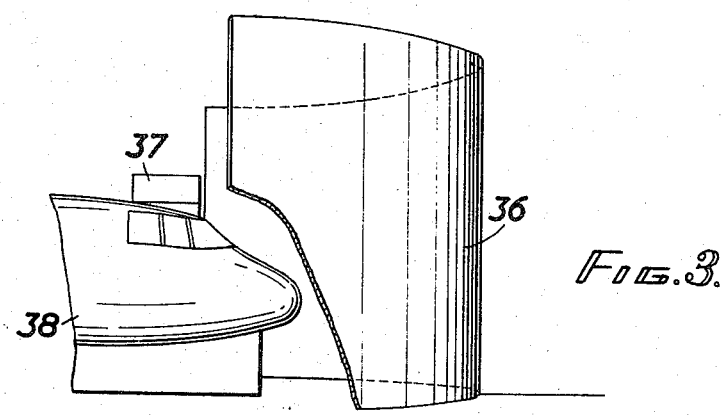
Fig. 3 shows the dummy trainer and the screen.

The apparatus shown in Figs. 1, 2 and 4 constitutes the projector 37 (Fig. 3).

The projector which has been described therefore projects an image of the illuminated areas 7 and 11 on to a screen and positions this image on the screen at a point such that the pilot of the dummy aircraft sees the image in the same position in his field of view as the lamp array would occupy in the field of view of the pilot of a real aircraft by virtue of his position, attitude and heading. In addition, the image will have been rotated to correct the orientation of the lamp array about the line of sight in accordance with the attitude and heading of the aircraft.

The row of lamps 7 will be visible to the pilot only when his aircraft is within a certain cone the angle of which will depend upon the manner in which the lamps are arranged in their reflectors. It can be arranged that limit switches will be operated by the devices which compute the position of the aircraft relative to the lamps when the pilot leaves this cone e.g. if he decides to make a further circuit and flies past the row of lamps and the mirror.

For some purposes, it might be possible to dispense with simulation of certain aspects of the movement of the aircraft. For example, it might be assumed that the roll angle of the aircraft would be substantially zero during the final stages of the approach.

Instead of using the zoom lens for varying the size of the image which is projected on to the screen, the size and areas of the apertures can be varied with range. Thus the apertures 7 could be formed by the co-operation of horizontal slots in a first fixed opaque screen with spiral slots in a second opaque screen, each of the spiral slots being given a thickness which varies from a minimum at one end to a maximum at the other. Lamps at the rear of the screens shine through the areas where the spiral slots in the second screen coincide with the horizontal slots in the first screen. When the range of the aircraft is a maximum, the second screen is so positioned that the apertures formed by the coincidence of the spiral and horizontal slots are of minimum width and are close together. When the range is a minimum the apertures are of maximum width and are widely spaced. Simultaneously, the width of the horizontal slots can be made to vary in accordance with range, and the diameter of the illuminated area formed by the recess in the transparent screen can be varied by means of an iris.

It will be clear that the movement of the central light spot on the screen with respect to the row of light spots can be achieved in an alternative manner if light from a fixed lamp is reflected on to the screen by an angularly movable mirror, the movement of the mirror being controlled in accordance with the movement of the aircraft relative to the array of lamps.

What I claim is:

1. Flight training apparatus for training a student pilot in the landing of an aircraft with the aid of a three-dimensional array of indicators of known position with respect to the landing surface, comprising a row of areas which are adapted to be illuminated and are fixed with respect to each other, another area which also is adapted to be illuminated and is movable with respect to the row of areas, means for causing movement of said other area in accordance with the assumed or computed relative change of the position of the aircraft and the array of indicators, a screen which is visible to the student pilot, and a projector unit for establishing on said screen images of the illuminated areas so as to make visible to the student pilot images which are representative of the array of indicators.

2. Flight training apparatus for training a student pilot in the landing of an aircraft with the aid of a three-dimensional array of indicators of known position with respect to the landing surface, comprising a screen which is visible to the student pilot, a projector unit arranged in association with said screen, a row of relatively fixed areas which are adapted to be illuminated and are arranged in a plane perpendicular to the optical axis of the projector unit, another area which also is adapted to be illuminated and is arranged to be movable in a plane which is perpendicular to the said optical axis, the projector unit serving to establish on the said screen an image of all these illuminated areas, and means for causing movement of said other area with respect to the row of fixed areas in accordance with the assumed or computed relative change of the position of the aircraft and the array of indicators.

References Cited in the file of this patent

UNITED STATES PATENTS

| | | |
|---|---|---|
| 2,307,840 | MacDonald | Jan. 12, 1943 |
| 2,350,351 | Grunberg | June 6, 1944 |
| 2,352,101 | Hutter | June 20, 1944 |
| 2,373,313 | Jeandron | Apr. 10, 1945 |
| 2,502,834 | Dreyer | Apr. 4, 1950 |
| 2,518,419 | Dehmel | Aug. 8, 1950 |
| 2,536,718 | Brandon | Jan. 2, 1951 |
| 2,662,305 | Alric | Dec. 15, 1953 |
| 2,671,970 | Schmitt | Mar. 16, 1954 |
| 2,694,869 | McNatt | Nov. 23, 1954 |
| 2,711,593 | Lewis et al. | June 28, 1955 |